March 24, 1970  J. E. HOWARD  3,502,126
APPARATUS FOR SLICING VEGETABLES
Filed Sept. 25, 1967  3 Sheets-Sheet 1

JAMES E. HOWARD
INVENTOR
BY
BUCKHORN, BLORE, KLARQUIST & SPARKMAN
ATTORNEYS

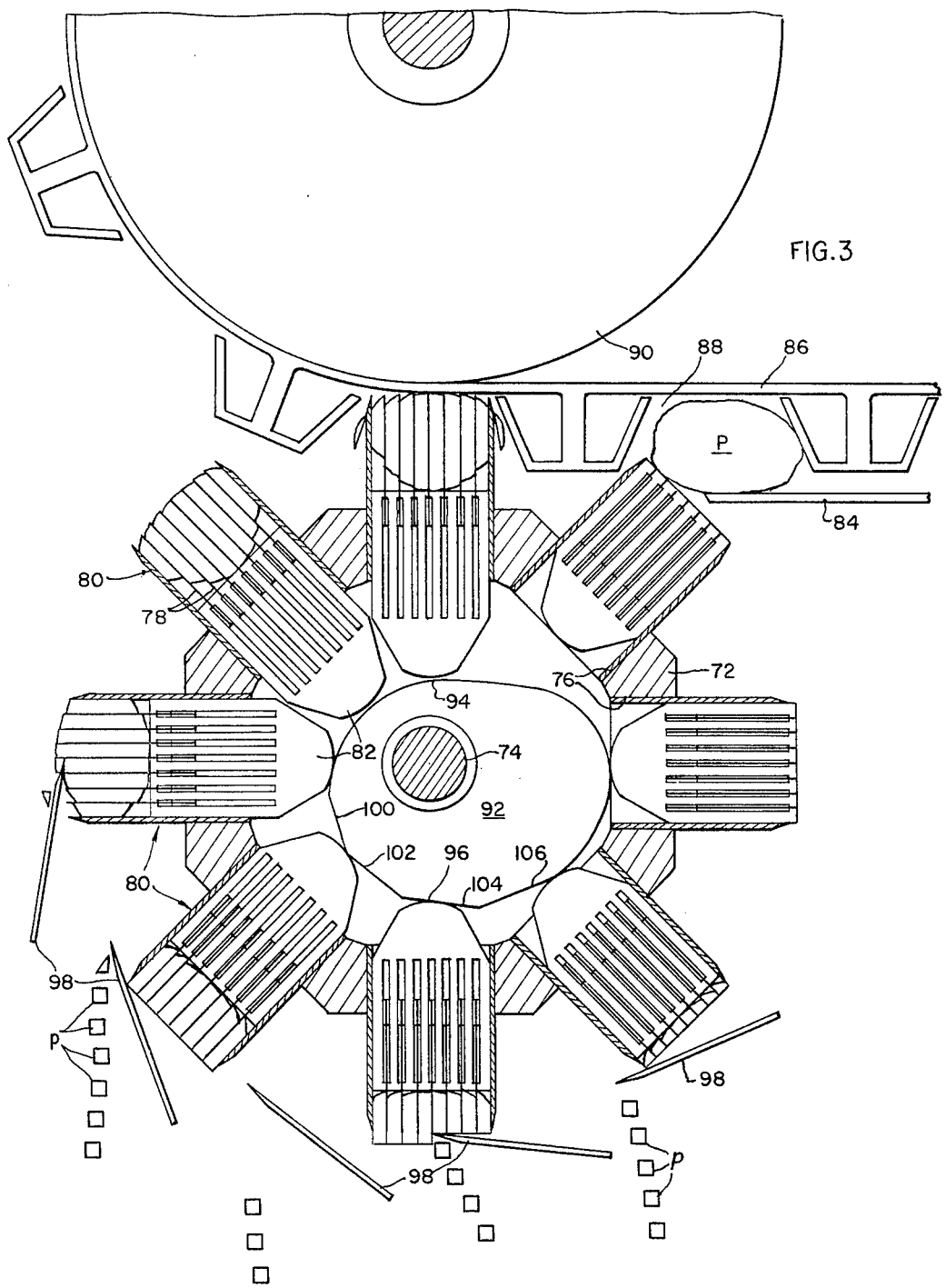

March 24, 1970      J. E. HOWARD      3,502,126
APPARATUS FOR SLICING VEGETABLES
Filed Sept. 25, 1967      3 Sheets-Sheet 3
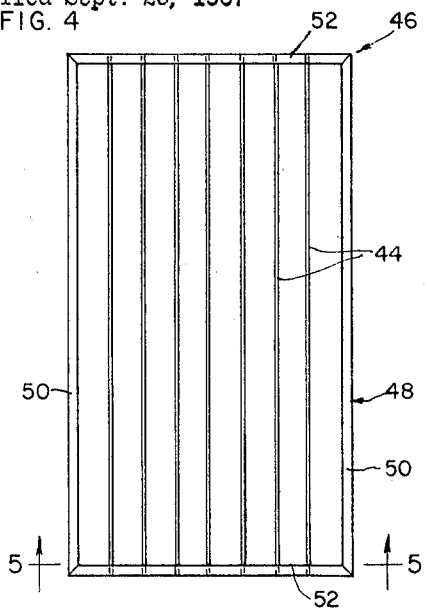
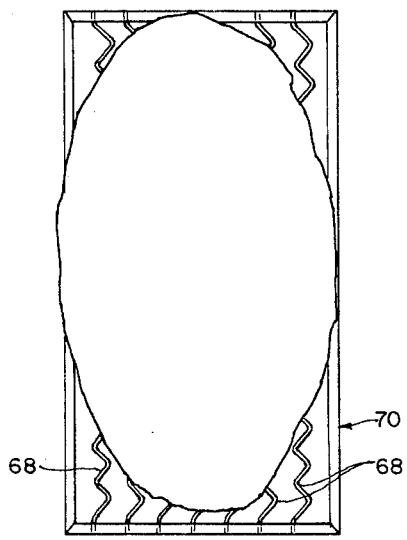
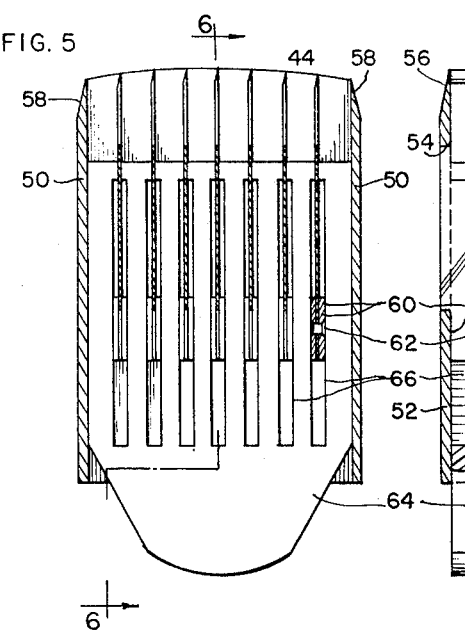
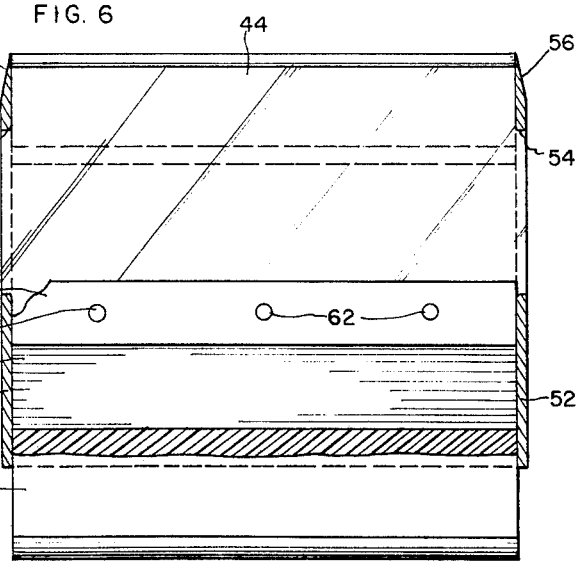
JAMES E. HOWARD
INVENTOR
BY
BUCKHORN, BLORE, KLARQUIST & SPARKMAN
ATTORNEYS United States Patent Office 3,502,126
Patented Mar. 24, 1970

3,502,126
APPARATUS FOR SLICING VEGETABLES
James E. Howard, P.O. Box 709, Pocatello, Idaho 83201
Filed Sept. 25, 1967, Ser. No. 670,249
Int. Cl. A23p *1/00;* B02c *11/04;* A47j *47/00*
U.S. Cl. 146—78             15 Claims

ABSTRACT OF THE DISCLOSURE

An apparatus for slicing vegetables comprising a rotor having receptacles in the periphery thereof, in each of said receptacles there being a set of radially-extending, parallel splitting blades for slicing a vegetable pushed in to the receptacle. A slotted plunger is mounted in each receptacle and a cam is mounted interiorly of the rotor for forcing the plunger outwardly as the rotor turns to eject the slices in increments from the receptacles, additional stationary blades cutting the slices transversely as the rotor moves past such blades.

BACKGROUND OF THE INVENTION

This invention relates to the slicing of vegetables and, more particularly, to a method and apparatus for slicing potatoes preparatory to their being french fried.

In the commercial preparation of french fried potatoes, it is preferable for the individual pieces to be of uniform length and cross-sectional area. The pieces may either be of square or rectangular cross section, and they may either be straight cut or crinkle cut longitudinally. In any event, it is desirable to avoid the production of pieces having less than a standard cross-sectional area and to avoid pieces having a sub-standard length. The method and apparatus of the present invention are designed to provide pieces of uniform length having a desired cross-sectional configuration.

SUMMARY OF THE INVENTION

The apparatus of the present invention comprises means for slicing a vegetable into a plurality of generally parallel slices, means for holding the slices together, means for ejecting the slices in increments from the holding means, and means for cutting the ejected increments generally transversely of the slices.

As such the apparatus comprises a rotor having generally radially-extending receptacles in the periphery thereof, and a set of radially-extending splitting blades in each of the receptacles, the spitting blades being disposed so that their planes lie in the transverse direction of the rotor. Means are provided to load an edible vegetable into the receptacles as each receptacle reaches a predetermined position of rotation, the loading causing the vegetable to be sliced in the radial direction of the rotor.

An ejecting plunger is slidably mounted in each receptacle, and each plunger is slotted so that a splitting blade is disposed within and supported by each of the slots. Cam means mounted interiorly of the rotor force the plunger radially outwardly in the receptacles during a predetermined degree of rotation of the rotor and thereby eject the vegetables from the receptacles. Skiving knives mounted in fixed positions exteriorly of the rotor can then slice the vegetables as they are ejected from the receptacles and moved by the rotor past the knives.

The method of the present invention comprises slicing a vegetable into a plurality of generally parallel pieces, holding the pieces together, and then cutting them transversely of the slices while they are held together.

It is an object of the present invention to provide potato pieces suitable for french frying having a uniform length and a substantially uniform cross section.

It is a further object of the present invention to provide a method and apparatus whereby substandard pieces of less than the desired length or of inadequate cross section are avoided.

It is a still further object of the invention to provide a method and apparatus for producing standard size pieces of potato for french frying economically and efficiently.

BRIEF DESCRIPTION OF THE DRAWINGS

In the drawings:
FIG. 3 is a side elevational view of a different embodiment of the invention.
FIG. 4 is a plan view of a different embodiment of means for slicing the potato into generally parallel pieces;
FIG. 5 is a sectional view taken on line 5—5 of FIG 4;
FIG. 6 is a side view of the slicing means shown in FIGS. 4 and 5;
and
FIG. 7 is a plan view of an embodiment of slicing means suitable for use in preparing crinkle cut pieces

DESCRIPTION OF THE PREFERRED EMBODIMENTS

Figure 2:
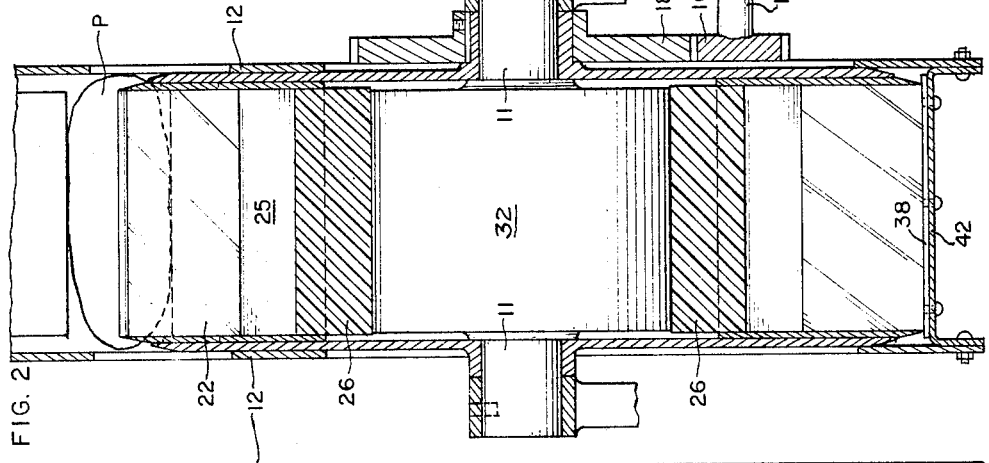
FIG. 2 is a cross-sectional view taken on line 2—2 of FIG. 1.
Figure 1:
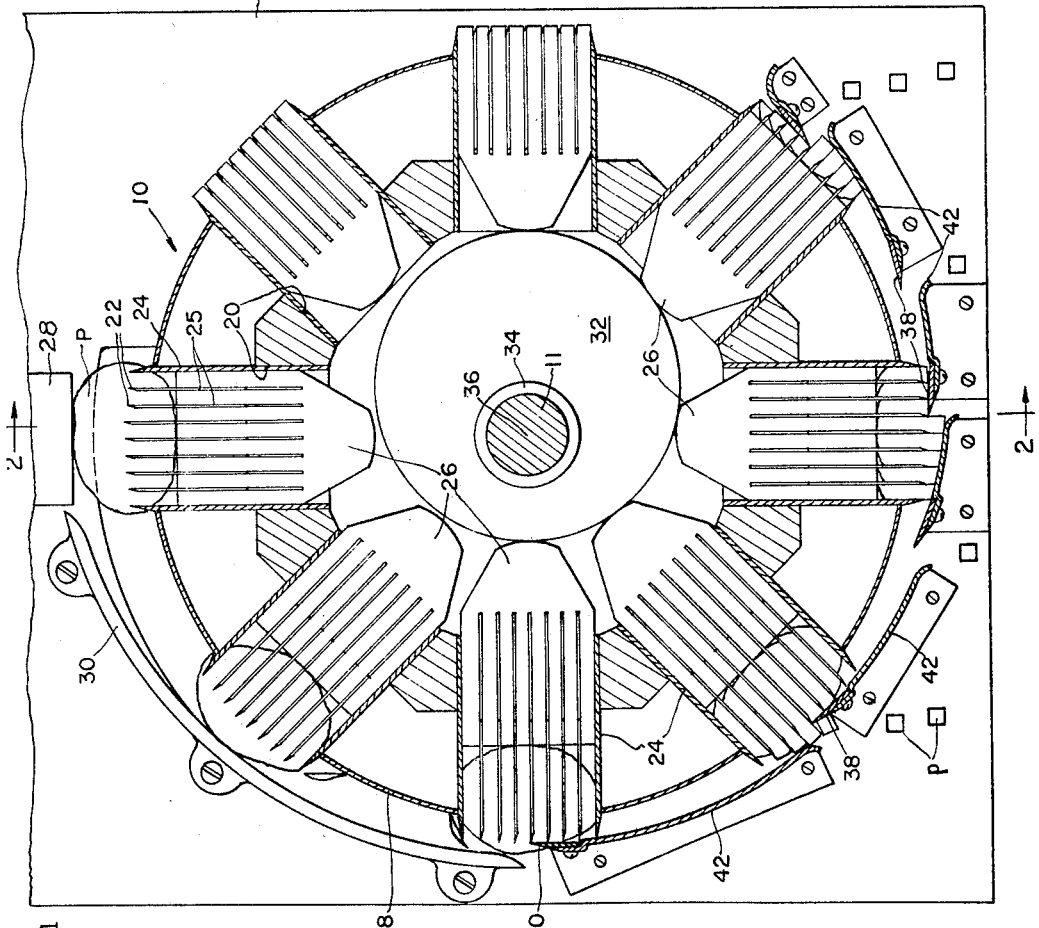
FIG. 1 is a side elevational view of apparatus constructed in accordance with the present invention.

Referring to the drawings and particularly to FIGS. 1 and 2, the vegetable-slicing apparatus of the present invention comprises a rotor 10 mounted for rotation on a shaft 11 and enclosed within fixed sideplates 12. Rotor 10 is driven by a motor (not shown) through a shaft 14, pinion 16, and gear 18. Rotor 10 is preferably made of stainless steel or other non-corroding material.

Rotor 10 is provided with a number of generally radially-extending receptacles 20 in the periphery thereof, in each of which is positioned a set of slicing blades 22 mounted in a box 24, the blades 22 being supported in transversely-extending slots 25 in a slidable comb-like holder or plunger 26. Plungers 26 are adapted to eject a potato P after it has been forced into a fully loaded position within a receptacle 20 and sliced by blades 22.

Blades 22 are mounted in boxes 24, one set to a box. Boxes 24 are inserted in rotor 10, one in each receptacle 20. Each box 24 contains a complete set of blades 22 properly spaced for slicing a potato. Mounting the blades 22 in boxes 24 is a very desirable way to install them in rotor 10. The boxes can easily be removed if different sized blades are desired, and this arrangement makes it easy to change sets of blades if damage should occur to any of them.

Blades 22 need comprise only a flat sheet of metal sharpened on one edge for straight-cut french fries. They should be as thin as practical and still be able to maintain their sharpness and rigidity during the slicing of a potato. Blades 22 must also extend sufficiently into receptacles 20 so that when plungers 26 are fully retracted within receptacles 20, the blades will still be supported by the slots 25 in plungers 26.

Since the rigidity of slicing blades 22 is entirely dependent on the support furnished by slots 25 in plungers 26, it is important that the slots 25 fit the blades 22 quite closely and that plungers 26 be accurately aligned within receptacles 20 in which they fit. Plungers 26 are preferably made of plastic, such as nylon, micarta, or "Teflon" brand, so that blades 22 can fit tightly in slots 25 and plungers 26 can fit snugly into receptacles 20 and still be able to function without lubrication.

Loading or rotor 10 is accomplished by a plunger 28 which only has to force potato P onto slicing blades 22 an inch or slightly more. As potato P rotates with the rotor, it slides under and against a loading cam 30 which further forces the potato onto blades 22. The action of cam 30 forces plungers 26 back into receptacles 20. The potato and the plunger combine to hold blades 22 even and straight as the potato is sliced. In approximately one-quarter of a turn of rotor 10, the potato is fully loaded in the machine and is completely sliced by blades 22.

An ejecting cam 32 is eccentrically mounted on shaft 11 within rotor 10. In its simplest form and as shown in FIG. 1, cam 32 is stationary and of circular cross section, and has a cam center 34 removed from the axis of rotation 36 of the rotor itself. As rotor 10 rotates, a potato is loaded into a receptacle 20 as previously described, and is forced through blades 22 until the potato reaches the fully loaded position after one-quarter of a turn. The shape of cam 32 then forces ejecting plunger 26 back out again so that the transverse cuts can be made as will be hereinafter described.

Cam 32 could also be made to rotate. In such case the cam center will be maintained at 34 as shown in FIG. 1.

Cam 32 accomplishes its ejecting function by maintaining a uniform ejecting force against the backs of plungers 26, the action being smooth and steady and without the necessity of using any lubricants except, of course, water. When plungers 26 are fully retracted into receptacles 20, as occurs after the rotor has completed one-quarter of a turn, blades 22 are in their most exposed position, having fully sliced through the potato. Blades 22 are wide enough so that a portion of them is still retained within slots 25. After the rotor has turned three-quarters of a revolution, plunger 26 is advanced radially to its most forward position, and potato P has been completely ejected from its receptacle 20. In this position blades 22 are up against the bottom of slots 25 in plunger 26.

Mounted peripherally around rotor 10 are a plurality of skiving blades 38 which cut the potato slices transversely as they are ejected from slicing blades 22. Blades 38 are spaced at intervals around the periphery of rotor 10 as determined by the shape of cam 32 to give equal protrusion of the potato between blades in the direction of rotation so that pieces of substantially constant cross section are achieved.

The first skiving blade that cuts the sliced potato is a trimming blade 40 which trims the irregular surface from the potato in preparation for the succeeding skiving blades which make the actual product cuts. Blades 38 extend the full transverse width of the rotor and are straight if straight-cut french fries are to be made.

Skiving blades 38 are mounted on retaining plates 42 which reinforce the skiving blades and insure that cam 32 ejects the slices of potato only to their proper radial position, so that each succeeding skiving blade is able to make a cut of the proper thickness.

FIGS. 4, 5 and 6 illustrate a different embodiment of the means by which the potato is sliced into generally parallel pieces. In this embodiment a set of slicing blades 44 is shown mounted in a box 46. Box 46 is adapted to be inserted in one of the receptacles 20 in rotor 10 and contains a complete set of blades 44 properly spaced for slicing a potato.

As shown in FIGS. 4–6, box 46 comprises a frame 48 having sidewalls 50, which extend transversely of the rotor, and end walls 52 which are slotted as at 54 to retain the individual blades 44. (See FIG. 6.) The edges of end walls 52 are themselves sharpened to form cutting blades 56 to make the end cuts on the potatoes in a manner to be hereinafter described. The edges of sidewalls 50 are also sharpened to form cutting blades 58 to cut the sides of the potato also in a manner to be hereinafter described.

FIG. 7 discloses an embodiment of the invention for use when it is desired to produce crinkle-cut french fries. As shown, a set of corrugated slicing blades 68 are mounted in a box 70 for insertion in the receptacles in the rotor. In this embodiment, the skiving blades are corrugated to match the corrugated slicing blades 68, and the plungers have slots made in a crinkle shape to help maintain the right pitch and shape of the blades 68. The plungers themselves in this embodiment are preferably made by laminating corrugated pieces of material together to fit blades 68, with joining of the laminations being made at the base of the plunger.

In the configurations previously mentioned for both flat blades and corrugated blades, it is possible that due to length, thickness, and spacing, the blades may not be rigid enough and may have a tendency to bow as the potatoes are forced thereagainst.

In the embodiment shown in FIGS. 4–6, each of blades 44 is provided with a stiffener 60 attached by rivets 62. This attachment may also be made by means of silver soldering or a suitable welding process. Where such stiffeners 62 are provided, the apparatus is provided with plungers 64 having a wider slot therein to accommodate the stiffeners 60. (See FIG. 5).

Another embodiment of the invention is disclosed in FIG. 3 of the drawings. In this embodiment a rotor 72 is mounted for rotation on a shaft 74 and is provided with a number of generally radially-extending receptacles 76 in the periphery thereof, in each of which is positioned a set of slicing blades 78 mounted in a box 80, blades 78 being supported by a slotted plunger 82. In the embodiment shown in FIG. 3, the potatoes P are carried along a level tray 84 toward the loading position of rotor 72 by a flighted chain or belt 86 having carrier pockets 88 therein. The belt 86 moves at a speed equal to the peripheral speed of rotor 72. As pockets 88 in belt 86 come into register with receptacles 76 in rotor 72, a potato P is forced through slicing blades 78 by pressure exerted by a head roller 90 over which belt 86 passes. If additional pressure is necessary beyond the point of tangency between belt 86 and the periphery of rotor 72 a loading cam (not shown) can be utilized to force the potato the rest of the way into the receptacle.

The embodiment illustrated in FIG. 3 is provided with a fixed cam 92 having a noncircular cross section. The surface 94 of the cam 92 opposite roller 90 is cut down below the circular shape—that is, it has a lesser radius than does the surface 96 of cam 92 oppositing skiving blades 98. Thus, in case of oversized potatoes ejecting plungers 82 are able to be retracted radially further into rotor 72 than would be the case were the cam circular in cross section.

By the time the potatoes are rotated to the position where skiving cuts are made, the radius of the cam 92 is increased. The surface of cam 92 in this area is stepped so that each of the ejecting plungers 82 remains stationary within its receptacle 76 as its associated skiving blade 98 is making transverse cuts through the sliced potato, radially-outward movement of the plungers 82 occurring only between the skiving cuts. In the embodiment illustrated in FIG. 3, cam 92 is provided with a first stepped surface 100, a second stepped surface 102, a third stepped surface 104, and a fourth stepped surface 106.

The skiving blades 98 in the apparatus shown in FIG. 3 are mounted at regular intervals around the periphery of rotor 72 since there is no outward movement of the potato during the skiving action. Obviously, where cam 92 is provided with an irregular surface, is must be stationary and not rotate as is possible with a circular cam.

The apparatus of the present invention operates in the following manner. A potato P is inserted in a receptacle, with its length in the traverse direction of the rotor, either by plunger 28 in the embodiment illustrated in FIGS 1 and 2, or by flighted belt 86 in the embodiment shown in FIG. 3. Inward pressure, directed radially and extered either by loading cam 30 or by roller 90, forces the potato against the slicing blades, pushing the plunger radially inwardly against the surface of the cam. This action cuts the potato into a plurality of generally parallel pieces, the lengths of which are approximately equal to the length of the potato.

Cutting blades 58 on sidewalls 50 of the boxes of blades 46 trim the sides of the potato, and cutting blades 56 on end walls 52 of boxes 46 trim the ends of the potato. The remaining portion of the potato is then in the form of slices which are held together by sidewalls 50 of box 46.

As the receptacle travels around the cam, the plunger forces the potato out of the receptacle so that the first trimming blade can trim the top of the potato. All the trimming cuts go to waste, being retained outside of a retaining plate 108. (See FIG. 1.)

Further movement of the receptacle around the surface of the cam causes the plunger to push the potato out of the receptacle, past the slicing blades an incremental distance which is controlled by the retaining plate 42, until the next skiving blade can make the first transverse cut through the slices while they are held together as aforementioned. The first group of pieces p of potato are thus cut, each one having a length no greater than the distance between end walls 52 of boxes 46 and each one having a cross-sectional area determined by the incremental distance that the plunger pushes the potato forward, which distance is accurately limited by the retaining action of retaining plate 42.

Additional movement of the receptacle around surface of the cam results in additional skiving cuts being made by blades 38 which are positioned around the periphery of the rotor in the embodiment illustrated in FIGS. 1 and 2 to give equal protrusion of the potato between blades in the direction of rotation. Similar cuts are made by the skiving blades 98 which are equally spaced around the periphery of the rotor in the embodiment shown in FIG. 3. In both embodiments, the pieces p of potato that are produced are thus all of substantially constant cross section.

In the foregoing description, the invention has been described with reference to certain particular preferred embodiments, though it is to be understood that the specific details shown are merely illustrative and that the invention may be carried out in other ways without departing from the true spirit and scope of the appended claims.

I claim:
1. In an apparatus for slicing vegetables,
   a comb-like holder;
   a plurality of blades slidable in and supported in generally parallel positions by said holder;
   means for retaining said blades in positions in which substantial portions thereof extend beyond said holder for slicing a vegetable pushed onto said blades; and
   means for pushing said holder relative to said blades to eject the slices of said vegetable in increments from the blades.

2. A device for cutting edible vegetables, comprising:
   a rotor having a plurality of generally radially-extending receptacles in the periphery thereof;
   means to rotate said rotor;
   a plurality of radially-extending splitting blades mounted in each of said receptacles, said blades having their planes in the transverse direction of said rotor;
   means to load an edible vegetable into said receptacles as each reaches a predetermined position of rotation, loading of said vegetable causing it to be sliced by said splitting blades in the radial direction of said rotor;
   an ejecting plunger slidably mounted in each of said receptacles, each of said plungers having a plurality of slots therein, one of said splitting blades being disposed within and supported by each of said slots;
   cam means mounted within said rotor and adapted upon rotation of said rotor sequentially to force said plungers radially outwardly of said receptacles during a predetermined degree of rotation, thereby to eject said vegetables therefrom; and
   a plurality of skiving blades mounted in fixed position exteriorly of said rotor and adapted circumferentially to slice said vegetables as the same are ejected from said receptacles and moved by said rotor past said blades.

3. A device as described in claim 2, in which said cam means comprises an eccentrically-mounted circular cam, the surface of which is in contact with said ejecting plungers.

4. A device as described in claim 3, in which said cam is a rotatable cam.

5. A device as described in claim 2, in which said splitting blades are supported at their ends within said receptacles.

6. A device as described in claim 2, in which said loading means comprises a loading plunger adapted to force an edible vegetable partially into one of said receptacles, and loading cam means adapted to force said vegetable completely into said one receptacle as said rotor is rotated.

7. A device as described in claim 2, in which said splitting blades are corrugated in the transverse direction of said rotor.

8. A device as described in claim 2, in which said skiving blades are corrugated in the transverse direction of said rotor.

9. A device as described in claim 2, in which said loading means comprises belt means tangential to said rotor for conveying said edible vegetables to said cutting device, said belt means being operated at a speed equal to the peripheral speed of said rotor.

10. A device as described in claim 9, further comprising a plurality of carrier pockets in said belt means, said pockets being in register with said receptacles as said belt means approaches said rotor, in each of said pockets an edible vegetable being disposed; and means to force said vegetables into said receptacles as said pockets register with said receptacles.

11. A device as described in claim 2, in which said splitting blades are radially larger than the width of said vegetable, thereby to remain supported by said slots when said plungers are fully within said receptacles.

12. A device as described in claim 2, in which each of said splitting blades is provided with a blade stiffener on its radially inner edge.

13. A device as described in claim 2, in which said cam means comprises a stationary cam, the surface of which opposite said loading means is of a lesser radius than is the surface opposite said skiving blades.

14. A device as described in claim 13, in which said surface of said cam opposite said skiving blades is stepped, whereby each of said ejecting plungers remains stationary within its receptacle as a skiving blade is slicing the vegetable therein, radially outward movement of said plungers occurring only between skiving cuts.

15. A device as described in claim 2, further comprising a retaining plate disposed between each of said skiving blades for insuring that said ejecting plunger ejects said vegetables only to the predetermined radial position, whereby each of said skiving blades can make its cut of predetermined thickness.

References Cited

UNITED STATES PATENTS

| | | | |
|---|---|---|---|
| 2,062,689 | 12/1936 | Weirauch | 146—78 |
| 2,923,337 | 2/1960 | Jouin | 146—78 |
| 3,150,701 | 9/1964 | Zimmerman | 146—78 |
| 3,195,594 | 7/1965 | Bloomquist et al. | 146—78 |

W. GRAYDON ABERCROMBIE, Primary Examiner

U.S. Cl. X.R.

146—164, 240